US005854426A

United States Patent [19]

Benda

[11] Patent Number: 5,854,426

[45] Date of Patent: Dec. 29, 1998

[54] METHOD AND APPARATUS FOR METERING AND DISTRIBUTING POURING MATERIAL, ESPECIALLY FOR THE PRODUCTION OF MINERAL-BONDED PARTICLE BOARDS

[75] Inventor: Wilhelmus Benda, Voorthuizen, Netherlands

[73] Assignee: Bau- und Forschungsgesellschaft Thermoform AG, Murten, Switzerland

[21] Appl. No.: 793,563

[22] PCT Filed: Aug. 18, 1995

[86] PCT No.: PCT/EP95/03306

§ 371 Date: Apr. 24, 1997

§ 102(e) Date: Apr. 24, 1997

[87] PCT Pub. No.: WO96/06715

PCT Pub. Date: Mar. 7, 1996

[30] Foreign Application Priority Data

Aug. 30, 1994 [NL] Netherlands ........................... 9401394

[51] Int. Cl.[6] ........................................ B29C 31/00

[52] U.S. Cl. ........................................ 73/432.1

[58] Field of Search ................................ 198/339.1, 341, 198/524, 525, 530, 534, 535, 571, 572, 575, 587, 861.6, 836.2, 638; 264/40.4, 40.7; 73/432.1

[56] References Cited

U.S. PATENT DOCUMENTS 4,557,882 12/1985 Arnold .
4,703,783 11/1987 Buksek .
4,847,022 7/1989 Bold .

FOREIGN PATENT DOCUMENTS

A 0 109 456 5/1984 European Pat. Off. .
A 0 230 483 8/1987 European Pat. Off. .
969 336 5/1958 Germany ................................ 198/587
A 31 42 871 5/1983 Germany .
A 37 19 129 12/1988 Germany .
A 4015583 11/1991 Germany .
A 41 28 636 3/1993 Germany .

*Primary Examiner*—Robert Raevis
*Attorney, Agent, or Firm*—Lahive & Cockfield, LLP

[57] ABSTRACT

The invention relates to a method and apparatus for metering and distributing pouring material (1) comprising a mixture of wood fibres or such base materials and a mineral binding agent for the production of chipboards, fibre boards or particle boards, especially cement-bonded particle boards, wherein the pouring material (1) is metered volumetrically and the volume and/or weight of the supplied pouring material (1) is controlled, such that along the length and also across the width of the boards to be produced a regular distribution is obtained. Starting from a supply bunker (2) and through a pivotal belt (3) the pouring material (1) is metered to an intermediate supply bunker (7) which in a metered manner supplies a stream of pouring material (1), being regular during the course of time as well as transversely to the direction of supply, to a metering belt (17) which distributes the material on top of a mould belt (22), in such a way that a uniform specific weight and a uniform distribution of the pouring material (1) across the entire surface of the complete boards are obtained.

18 Claims, 1 Drawing Sheet

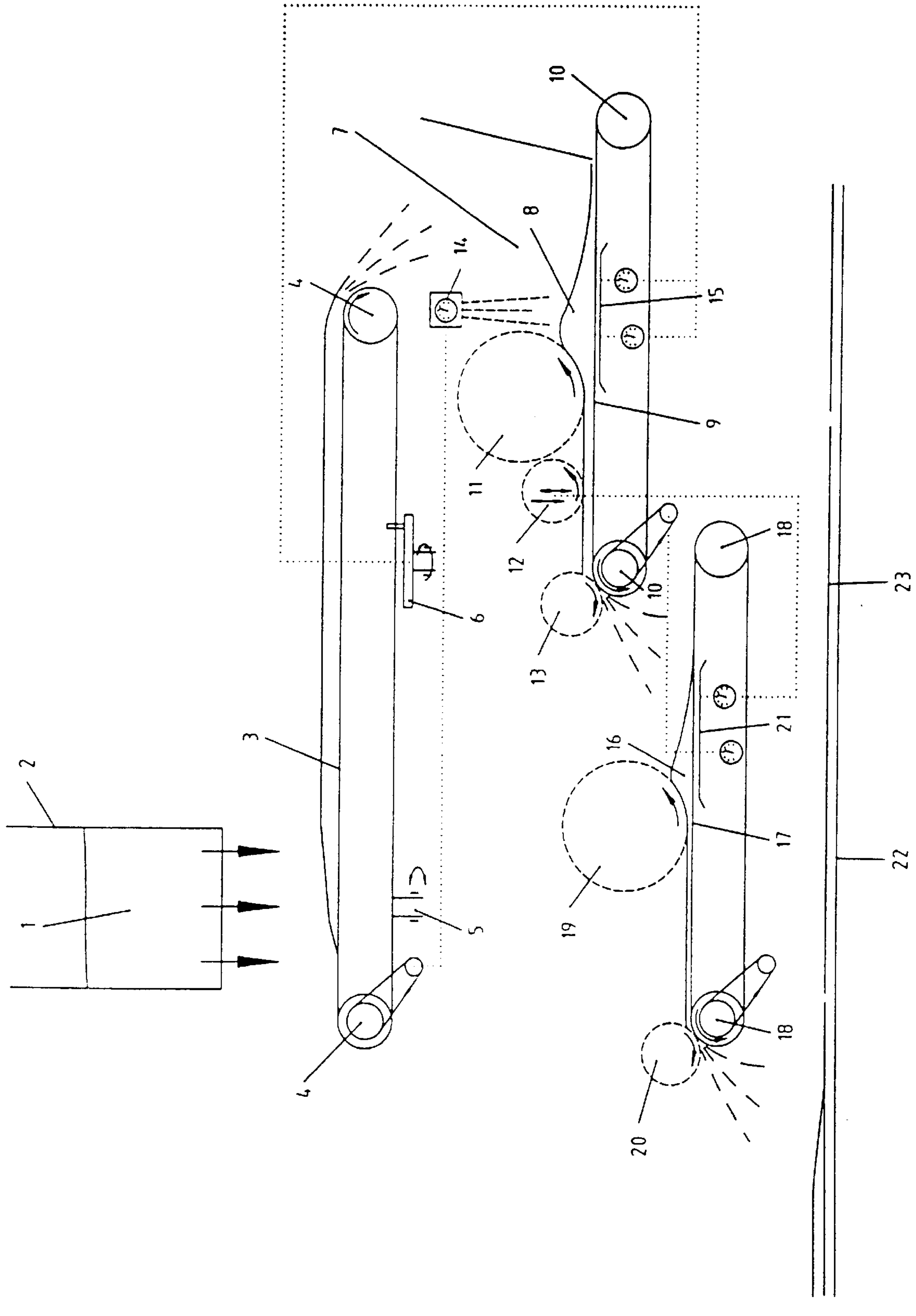
1
2
3
4
4
5
6
7
8
9
10
10
11
12
13
14
15
16
17
18
18
19
20
21
22
23

METHOD AND APPARATUS FOR METERING AND DISTRIBUTING POURING MATERIAL, ESPECIALLY FOR THE PRODUCTION OF MINERAL-BONDED PARTICLE BOARDS

BACKGROUND

The invention relates to a method for metering and distributing pouring material comprising a mixture of wood fibers or such base materials and a mineral binding agent for the production of chipboards, fiber boards or particle boards, especially cement-bonded particle boards, wherein the pouring material is metered volumetrically and the volume and/or weight of the supplied pouring material is controlled.

In the production of mineral-bonded particle boards fiber boards, stringent demands are made in metering and distributing the pouring material. To obtain high quality and high tensile and bending strength in the boards to be produced, it is necessary that in completed boards no variations occur in the surface weight and that the material be regularly distributed along the entire length and width of the boards. It is desirable that the boards have largely the same specific weight and a regular unit of area-related structure.

The importance of a regular distribution of pouring material along the width of complete boards may be illustrated with an example from the practice of the production of casing concrete elements according to the Thermoform/Thermoklith-process. In this production process, 2×0.5 m wood wool cement-construction boards (WWC-boards) are divided in the longitudinal and transversal direction such that four 1×0.25 m basic parts are formed. Next, these basic parts arc interconnected in pairs and in parallel to each other using steel spacers pressed into the sides of the basic parts. Because the width distribution of the material in the WWC-boards is not regular enough, two basic parts having a higher density and two basic parts having a lower (too low a) density are obtained after dividing a WWC-board. In the basic elements having a density that is too low, either the spacers experience hardly any or no grip and will loosen up or pieces will break away from the boards while the spacers are pressed in. This leads to rejection of these elements. A constant and regular width distribution of the material in the WWC-boards would lead to reducing the rejection percentage of the complete Thermoform/Thermoklith-casing concrete elements to a minimum.

In the production of wood particle boards and wood fiber boards, one usually, in a metered manner, supplies the pouring material to a traveling mould belt from a bunker through at least one distributing device. With such devices one usually employs a method of metering the pouring material using a weight or volume control of the layer of pouring material distributed onto the mould belt or a combination of both controls. A corresponding method and device are described in DE-C-1,048,691. From a supply bunker, pouring material is led to a metering belt where, at some distance above the metering belt, a counter-acting scraping drum creates an intermediate supply of pouring material by rotating in the opposite direction and volumetrically meters this pouring material. The metering belt transfers this pouring material, in a metered manner, to a weighing belt by controlling the traveling speed of the metering belt using a control device, such that the amount of material on the weighing belt remains constant in respect of its weight. The weighing belt conveys the material with a constant speed such that a regular amount of pouring material is supplied to the mould belt distributed as a regular layer.

A device in correspondence with the above method can supply a constant stream of pouring material to the mould belt because of a weight or volume control of the distributed layer. Even with a compressible pouring material which rapidly experiences compressions, such as those used for the production of cement-bonded particle boards, regular metering and distribution of the pouring material into the moulds is possible by using an intermediate supply bunker, but only if, with a constant supply of material, the level of pouring material in the intermediate supply bunker also remains, as much as possible, constant in time as well as constant transversely to the direction of supply. The pressure and load onto the lowermost layers of pouring material in the bunker and ahead of the counter-acting scraping drum may differ because the level, and thus the weight, of the pouring material is not regular in time and across the entire width of the supply of material. This leads to compressions and variations in specific weight of the pouring material and has a negative influence on the board quality. Until now, it has appeared impossible to insure that the amount of pouring material distributed across the width of the intermediate supply ahead of the counter-acting scraping drum remained constant. It has appeared impossible to set the counter-acting scraping drum relative to the conveyor belt such that, even after a while, the height of pouring material in the intermediate supply bunker does not have an oblique cross sectional profile across the width of the conveyor belt. In the present practice, this problem is regularly solved by manually distributing the material across the intermediate supply bunker using a rake.

Another disadvantage of the above method is that, due to the oppositely rotating motion above the metering belt, the counter-acting scraping drum pushes the pouring material ahead of the counter-acting scraping drum, such that the material can settle out. This may cause compression, as a result of which the specific weight of the pouring material is no longer regular. This effect often occurs in the production of gypsum-bonded as well as cement-bonded particle boards and it is unfavorable for the homogeneity and quality of the particle boards to be produced.

To solve the above-mentioned problems, a method has been developed, as described in DE-A-3,719,129, according to which the pouring material is metered without using an intermediate supply bunker. In the apparatus according to this method a reciprocating chute lays down a regular stream of pouring material in overlapping mass-stripes transversely to the direction of travel of the mould belt. Based upon a measurement of the height profile of the distributed pouring material, a control device calculates the speed profile of the reciprocating motion of the conveyor belt or chute. This determines the pattern of the mass-stripes such that a smooth height profile is developed. A combing drum is used to remove irregularities and to direct the pouring material. After at least one distributing device, the pouring material is distributed on a continuously running mould belt as a regular layer of material. At the mould belt, a detector measures the height profile across the width of the distributed layer.

Especially in respect of the production of boards having a low specific weight and comprising a rapidly curing binding agent, such as gypsum-bonded particle boards and fiber boards, the illustrated method leads to a satisfying result. With such a binding agent having a low pouring weight, only few compressions will occur due to the relatively short residence time of the pouring material in the distributing device which is well-determined and almost equal for all particles. However, possible compressions or irregularities in the supply of pouring material are not necessarily eliminated or reduced by such a device. Especially when dealing with compressible pouring materials having a larger pouring weight, which will lead more rapidly to compression, such as with cement-bonded particle boards, such a device offers completed boards of reduced quality.

By controlling the amount of material to be metered using the height of the pouring material behind the distributing device, it may occur that, notwithstanding a constant height, the unit of area-related weight of the boards to be produced is not constant because of variations in the specific weight of the pouring material. There is no possibility to correct defects of the measured height profile once noted. As a result, variations in the profile and pouring weight are inevitable. It can be noted that compressions or irregularities already present in the pouring material cannot be eliminated or leveled through the combing drum. Moreover, because the material in the chute falls a long distance compressions will occur quickly when the pouring material has a large pouring weight. Further, the response of the control, based upon the height profile to be measured, is very slow due to the positioning of a detector behind the distributing device and the time elapsed between the occurrence of a deviation in the height profile at the chute and the passage of said deviation at the detector is relatively long. Among others, this is a reason why, in practice, this method with an active control of the chute through a control device and by means of profile measurements does not function correctly. For shortening the reaction time of the control, the detector should be positioned ahead of the throwing drum. However this is not possible because the irregularities of the distributed layer will not yet have been eliminated and the material will not yet have been oriented ahead of the throwing drum.

It is an object of the invention to solve all above problems in a simple, but nevertheless effective way and, further, to comply with all demands in producing wood fiber boards, especially cement-bonded particle boards, having a good quality.

SUMMARY

Thus, according to the invention, the method is characterized in that during the course of time, as well as transversely to the direction of supply of the material, a varying and metered volume of pouring material is supplied. By means of the volume and/or weight determinations of the supplied pouring material, a control device determines the supply speed and metering of the pouring material such that the completed boards will, along their length and in the direction of supply, have a homogeneous structure and a regular distribution of pouring material. According to a preferred embodiment, it is possible that the volume of pouring material to be metered and supplied can be determined by means of a number of independent volume and/or weight determinations transversely to the direction of travel of moulds on a mould conveyor. By means of this determination, one can obtain a volume of the material to be metered and distributed varying across the width, such that the boards will have a homogeneous structure and regular distribution of pouring material in transversal direction as well.

To obtain a regular stream of supplied pouring material towards a metering belt from which the pouring material is delivered into moulds or onto a mould conveyor, a method according to the invention preferably supplies the pouring material to an intermediate supply on a metering belt in a volumetrically metered manner in which the volume and/or weight of the intermediate supply is kept constant. To obtain a regular distribution and metering in the distributed layer of pouring material in the moulds or on top of the mould conveyor, the height of pouring material of the intermediate supply onto the metering belt should remain constant with a constant amount of supply from the metering belt. By means of a regular stream of supplied pouring material, without irregularities and compressions during the course of time as well as transversely to the direction of supply towards the metering belt and by supplying the material from the metering belt towards the mould belt with a constant volume, boards having a homogeneous structure and having a good quality can be produced.

It is preferred, that the volume and/or weight determinations of the amount of pouring material supplied occur immediately after a device supplying and metering the pouring material. An active control can be based upon a direct volume and/or weight determination immediately behind the regulating devices, which control reacts on the measurement signals without substantial delay of time. Through the application of so-called counter-acting scraping drums, it is possible to position a measuring instrument directly ahead of these drums and directly after the metering device to measure the weight of the pouring material. Ahead of such drum, piles (intermediate supplies) of pouring material are created such that possible irregularities due to distributing the pouring material are leveled out and thus do not have any effect on the measurements and the controls based there upon. While applying the method according to the invention, one can realize that the boards to be produced obtain a homogeneous structure and a uniform unit of area-related specific weight, also in transversal direction of the boards, such that the bending and tensile strength are positively influenced.

The apparatus for distributing and metering pouring material applying the method according to the invention a supply bunker, a conveyor belt and a mould conveyor, wherein, starting from the supply bunker, pouring material is supplied to the conveyor belt and finally to the mould conveyor, is characterized in that means are provided for supplying the pouring material in a metered manner to the conveyor belt during the course of time as well as distributed over the width of the conveyor belt. Preferably, the means comprise a conveyor belt which can carry out a pivotal reciprocating motion transversely to the direction of travel of the mould conveyor. Due to the pivotal or reciprocating motion, the supply bunker can be narrower than the mould conveyor, such that across its width in the bunker less height differences occur compared to a wider bunker. Thus also less pressure and loading differences will occur at the lowermost layers of the pouring material, resulting in a higher degree of uniformity of specific weight and less compressions. Further, differences in specific weight of the pouring material can be eliminated when the supply bunker is disposed perpendicularly to the supply from the supply bunker and the traveling conveyor belt, such that the pouring material is mixed.

Preferably, the apparatus according to the invention comprises a relatively small intermediate supply bunker. With a pivotal or reciprocicating motion, the pouring material is deposited on a next conveyor belt which has almost the same width as the moulds or the mould conveyor. This conveyor belt defines the bottom of the small intermediate supply bunker. The advantage of a relatively small intermediate supply bunker is that there will be far less damming up of the pouring material ahead of the counter-acting scraping drum, such that less settling out and separation will occur and the pouring material will have a more homogeneous structure.

With such an intermediate supply bunker, it is preferred to measure the volume and/or weight of the supplied material and to control the supply of pouring material using the measurements of height and/or weight such that with a larger height and/or larger weight, a smaller volume of pouring material will be supplied due to a lower pouring material supply speed of the conveyor belt and with a smaller height and/or lower weight, the supplied amount of pouring material will be increased by a higher supply speed. Preferably, in the apparatus, the intermediate supply bunker is divided into a number of adjacent sections. If for all sections the pouring material is separately controlled in respect of volume and/or weight, a metered amount of pouring material can be supplied to all sections independently from each other by regulating the speed profile of the pivotal or reciprocating motion with which the intermediate supply bunker is fed such that at locations where a smaller height and/or lower weight is measured, more pouring material is deposited and at locations where a larger height and/or higher weight is measured, a smaller volume of pouring material is supplied.

Preferably there is provided a metering belt. A uniform stream of pouring material towards the metering belt from, for example, the intermediate supply bunker is obtained by feeding, through volume metering, pouring material to a metering belt wherein the supplied pouring material can be controlled as to volume and/or weight and is kept constant during the course of time as well as transversely to the direction of travel of the metering belt. The opening in the intermediate supply bunker above the conveyor belt, which belt defines the bottom of the intermediate supply bunker, can be set, and together with the traveling speed of the respective conveyor belt, which is controlled by the volume and/or weight measurement, determines the volume of pouring material supplied to the metering belt. Corrections with respect to an amount of material varying across the width being supplied to the metering belt are possible by means of several independent height and/or weight measurements across the width of the metering belt of the poured material. By means of weight determinations across the direction of supply of the pouring material on the metering belt, for example, using a number of weighing instruments, preferably two, a height of a counter-acting scraping drum varying across the width and relative to the conveyor belt can be set such that a volume varying across the width can be supplied to the metering belt.

According to the invention, it is preferred that the metering counter-acting scraping drum comprise a singular drum with two suspension locations which, by means of a control device, can be set in height independently such that the metering counter-acting scraping drum can be set in a position which is not parallel to the underlying conveying conveyor belt. Such an embodiment of the metering counter-acting scraping drum is simple to construct and is sufficiently functional for realizing a uniform supply of pouring material transversely to the direction of travel.

According to a preferred embodiment of the invention, a counter-acting scraping drum is provided ahead of the metering counter-acting scraping drum for leveling the pouring material supplied to the conveyor belt. A first large counter-acting scraping drum levels the supplied material, and behind of it, as seen in the direction of travel, a second counter-acting scraping drum functions for metering the material. Such a division can be applied advantageously because then an accumulation of pouring material ahead of the second counter-acting scraping drum has a smaller height such that less compression will occur.

DETAILED DESCRIPTION

The invention will be elucidated further referring to the drawing in which an embodiment of an apparatus according to the invention is illustrated.

The FIGURE shows a side elevational view of an apparatus according to the invention for metering and distributing pouring material. The illustrated distributing device comprises a supply bunker 2, a conveyor belt 3 to be indicated hereafter as pivotal belt, an intermediate supply bunker 7, a metering belt 17, and a mould conveyor 22 onto which the pouring material 1 has to be distributed in a metered and regularly distributed way. Starting from the supply bunker 2, the mixed pouring material 1 is supplied to a pivotal belt 3. The width of the pivotal belt is smaller than the width of the boards to be produced and smaller than the width of the final mould conveyor 22 onto which the moulds 23 are positioned. The pivotal belt extends perpendicularly to the supplied stream of material from the supply bunker 2. It is conceivable that, between the supply bunker and a pivotal belt, a conveyor belt may be positioned such that it is not necessary that the supply bunker be positioned immediately above the pivotal belt.

The pivotal belt 3 extends around two rollers 4 which are driven and rotated such that the pouring material is supplied to the intermediate supply bunker 7. Due to a pivot 5 of the pivotal belt directly below the supplied stream of pouring material and due to an eccentric drive 6 close to the end of the pivotal belt, the pivotal belt reciprocates around the pivot 5 such that the continuous stream of material is deposited from the pivotal belt onto the conveyor belt 9 in stripes, transversely to the direction of travel.

The conveyor belt 9 defines the bottom of an intermediate supply bunker 7 and is driven by two rollers 10. Immediately above the surface of the conveyor belt 9, a first counter-acting scraping drum 11 is positioned for leveling irregularities which are a result from the supply of the pouring material in mass-stripes. The height of the first counter-acting scraping drum relative to the conveyor belt is setable. In the immediate vicinity behind the first counter-acting scraping drum, as seen in the direction of conveyance, and above the conveyor belt also, a second counter-acting scraping drum 12 is positioned of which both ends can be set in height independently from each other such that the material can be supplied to a metering belt 17 in a metered manner. This first counter-acting scraping drum 11 is constructed as a drum having pins and an open structure such that a surplus amount of pouring material can easily be thrown back by the second counter-acting scraping drum 12 into the area of operation of the first counter-acting scraping drum 11, such that the material is repositioned ahead of the first counter-acting scraping drum.

The accumulation of pouring material being created ahead of the first counter-acting scraping drum defines an intermediate supply 8 of pouring material. The height of the intermediate supply can be determined by an ultrasonic height sensor 14 positioned above the intermediate supply bunker. The measurement values of the height sensor 14 give an indication of the volume of pouring material 8 ahead of the counter-acting scraping drum 11 on top of the conveyor belt 9 and, through a control device, are used to control the traveling speed of the pivotal belt 3. Below the conveyor belt and ahead of the first counter-acting scraping drum alongside each other and transversely to the direction of supply, a number, at least two, of weighing devices 15 are positioned which together cover the entire width of the conveyor belt. Possibly in combination with the height sensor, the sum of the weights measured by the weighing devices at the intermediate supply may be used for controlling the traveling speed of the pivotal belt 3. By means of the separate measuring signals of the weighing device one can determine to what extent the intermediate supply 8 is distributed regularly across the width of the conveyor belt 9. Using a control device, a speed profile can then be determined for the eccentric drive 6 such that the reciprocicating motion of the pivotal belt is controlled to ensure that across the entire width of the conveyor belt a regular amount of pouring material is supplied to the intermediate supply bunker. Because the pivotal belt is relatively narrow, the mass-stream on this belt will be concentrated and an accurate metering of pouring material towards the intermediate supply bunker and a smaller intermediate supply bunker is possible. By the application of a first counter-acting scraping drum ahead of a second counter-acting scraping drum, which volumetrically meters the material, a smaller accumulation of pouring material ahead of the second counter-acting scraping drum will be created, thus diminishing the risk of compression.

Starting from the intermediate supply bunker 7 the material 8 is supplied to a metering belt 17. At some distance above and rearward from the end of the conveyor belt 9 and roller 10, a striking drum 13 is positioned to ensure that, starting from the intermediate supply bunker, the pouring material is distributed onto the metering belt in a regularly distributed manner.

The metering belt 17 supplies the pouring material in a metered and regularly distributed manner to the continuously running mould conveyor 22 on top of which moulds 23 are positioned. The metering belt extends around rollers 18 which drive the metering belt with a constant speed. A height-adjustable counter-acting scraping drum 19 above the metering belt meters the pouring material 16 with a constant volume. A striking drum 20 is positioned at some distance above and rearward from the end of the metering belt and roller 18 The striking drum 20 distributes and meters the material into the moulds 23 on the mould conveyor 22.

The speed with which the conveyor belt 9 travels depends upon the weight of pouring material 16 ahead of the counter-acting scraping drum 19 being positioned above the metering belt 17. Ahead of the counter-acting scraping drum and transversely to the motion of travel a number of, preferably two, weighing devices 21 are positioned alongside each other. Using the total amount of pouring material 16 on these weighing devices, a control device determines the traveling speed of the conveyor belt 9 in the intermediate supply bunker 7. To obtain a regular distribution of the pouring weight across the width of the metering belt, a control device determines the position of the second counter-acting scraping drum 12 in the intermediate supply bunker using the amount of pouring material on top of the separate weighing devices 21. The ends of the second counter-acting scraping drum 12, which can be set in height separately such that the second counter-acting scraping drum may assume a position not parallel to the surface of the conveyor belt 9, are controlled by a control device such that at the opposite sides of the metering belt different amounts of pouring material may be supplied.

It will be clear that due to the application of an intermediate supply bunker 7 ahead of the metering belt 17 the amount of pouring material on the metering belt need not be as large. The pouring material will experience less damming up or settling out and the risk of compression will be reduced. A further purpose of the intermediate supply bunker 7 is to obtain a regularly shaped and constant stream of pouring material towards the metering belt such that, using a constant traveling speed of the metering belt and a constant opening above the metering belt, a homogeneous layer having a constant surface density can be distributed on top of the mould belt. However, it is possible not to apply the intermediate supply bunker in the apparatus. It is further conceivable that the pivotal belt be abandoned from the apparatus such that the pouring material is deposited into the intermediate supply bunker directly from a wide supply bunker. However, such a simplification of the apparatus will have a negative influence on the homogeneity and quality of the boards to produced.

It is to be noted that other embodiments of the second counter-acting scraping drum 12 in the intermediate supply bunker 7 are possible. In this aspect one can think of a counter-acting scraping drum which is divided into several segments each of which might be set and controlled in height relative to the conveyor belt 9 independently, for example as described in FP-A-0,161,323. Furthermore, it is possible to increase or diminish the opening between the counter-acting scraping drum and the conveyor belt by the application of rams below the conveyor belt which may be set and controlled in height, for example as described in DE-C-3,734,291. In such embodiments it is possible that a number of weighing devices are applied alongside each other and transversely to the direction of supply. Furthermore, instead of the provision of weighing devices, it is possible to split up the conveyor belts into a number of sections transversely to the direction of supply, wherein each section is carried out as a weighing belt.

The invention is not limited to the embodiment herein described but can be varied widely within the scope of the claims. What is claimed as new and secured by Letters Patent is:

1. A method for metering and distributing pouring material onto a moulding conveyor, said method comprising the steps of metering the pouring material volumetrically, controlling the volume and/or weight of the supplied pouring material, and supplying, during the course of time as well as transversely to the direction of supply of the material, a varying and metered volume of pouring material to a measurement device before distributing the pouring material on the moulding conveyor.

2. A method according to claim 1 wherein the metering step further comprises the step of generating a uniform flow of the pouring material to an intermediate supply on a conveyor belt.

3. A method according to claim 1 wherein the metering step further comprises the steps of supplying the pouring material to an intermediate supply on a conveyor belt in a volumetrically metered manner, and controlling the intermediate supply by keeping the volume and/or weight constant.

4. A method according to claim 1 wherein the controlling step further comprises the step of determining, by means of a number of independent volume and/or weight determinations transversely to the direction of travel of moulds on a mould conveyor, the volume of pouring material to be metered and supplied.

5. A method according to claim 1 wherein the controlling step further comprises the step of providing means for determining the volume and/or weight of the amount of pouring material supplied immediately following the metering step.

6. Apparatus for distributing and metering pouring material in a downstream direction from a primary supply bunker containing the pouring material to a mould conveyor, the apparatus comprising a conveyor belt for accepting pouring material from the primary supply bunker, measurement means coupled to the conveyor belt for determining the amount of pouring material on the conveyor belt, a metering device disposed downstream from the measurement device for providing a metered amount of pouring material to the mould conveyor, and reciprocating means for supplying the pouring material in a metered manner to the conveyor belt during the course of time as well as distributed over the width of the conveyor belt.

7. Apparatus according to claim 6 wherein the reciprocating means comprises a pivotal conveyor belt which can carry out a pivotal reciprocating motion transversely to the direction of travel of the mould conveyor.

8. Apparatus according to claim 7 wherein the pouring material from the primary supply bunker travels along a path which is perpendicular to the pivotal conveyor belt.

9. Apparatus according to claim 6 further comprising means for controlling the reciprocating motion of the reciprocating means.

10. Apparatus according to claim 6 further comprising a relatively small intermediate supply bunker disposed to accept pouring material from said reciprocating means.

11. Apparatus according to claim 10 wherein the intermediate supply bunker comprises a number of adjacent sections.

12. Apparatus according to claim 6 further comprising a metering belt disposed to accept pouring material from the conveyor belt and to distribute the pouring material to the mould conveyor.

13. Apparatus according to claim 6 wherein the metering device comprises a metering counter-acting scraping drum for providing a supply of the metered amount of pouring material, the metered amount varying transversely to the direction of travel.

14. Apparatus according to claim 13 wherein the metering counter-acting scraping drum comprises a singular drum suspended above the conveyor belt at a first adjustable suspension location having a first height above the conveyor belt and at a second adjustable suspension location having a second height above the conveyor belt, and a control device configured to control independently adjust the first and second adjustable suspension locations independently of each other, thereby controlling the first and second heights independently.

15. Apparatus according to claim 13 further comprising a height-adjustable element adjacent to the metering counter-acting scraping drum for providing a varying volume of pouring material to the mould conveyor.

16. Apparatus according to claim 13 further comprising a downstream counter-acting scraping drum disposed downstream from the metering counter-acting scraping drum for leveling the pouring material supplied to the conveyor belt.

17. A method for metering and distributing pouring material comprising the steps of depositing a volumetrically metered portion of the pouring material at a measurement site, measuring the quantity of the metered portion of the pouring material at the measurement site, thereby providing a pouring material measurement, and metering, in response to the pouring material measurement, the metered portion of pouring material, thereby forming a redistributed quantity of pouring material, distributing the redistributed quantity of pouring material on a mould conveyor.

18. Apparatus for distributing and metering pouring material in a downstream direction from a primary supply bunker to a moulding conveyor, said apparatus comprising reciprocating means disposed to receive pouring material from the primary supply bunker, a conveyor belt for accepting a metered quantity of pouring material from the reciprocating means, a measurement device coupled to the conveyor belt for providing a measurement of the pouring material on the conveyor belt, and metering means for distributing the pouring material on the conveyor belt onto the mould conveyor.

* * * * *